O. P. GREENWOOD.
DISTRIBUTING MACHINE.
APPLICATION FILED SEPT. 19, 1912. RENEWED SEPT. 30, 1919.
1,339,557.
Patented May 11, 1920.
3 SHEETS—SHEET 1.
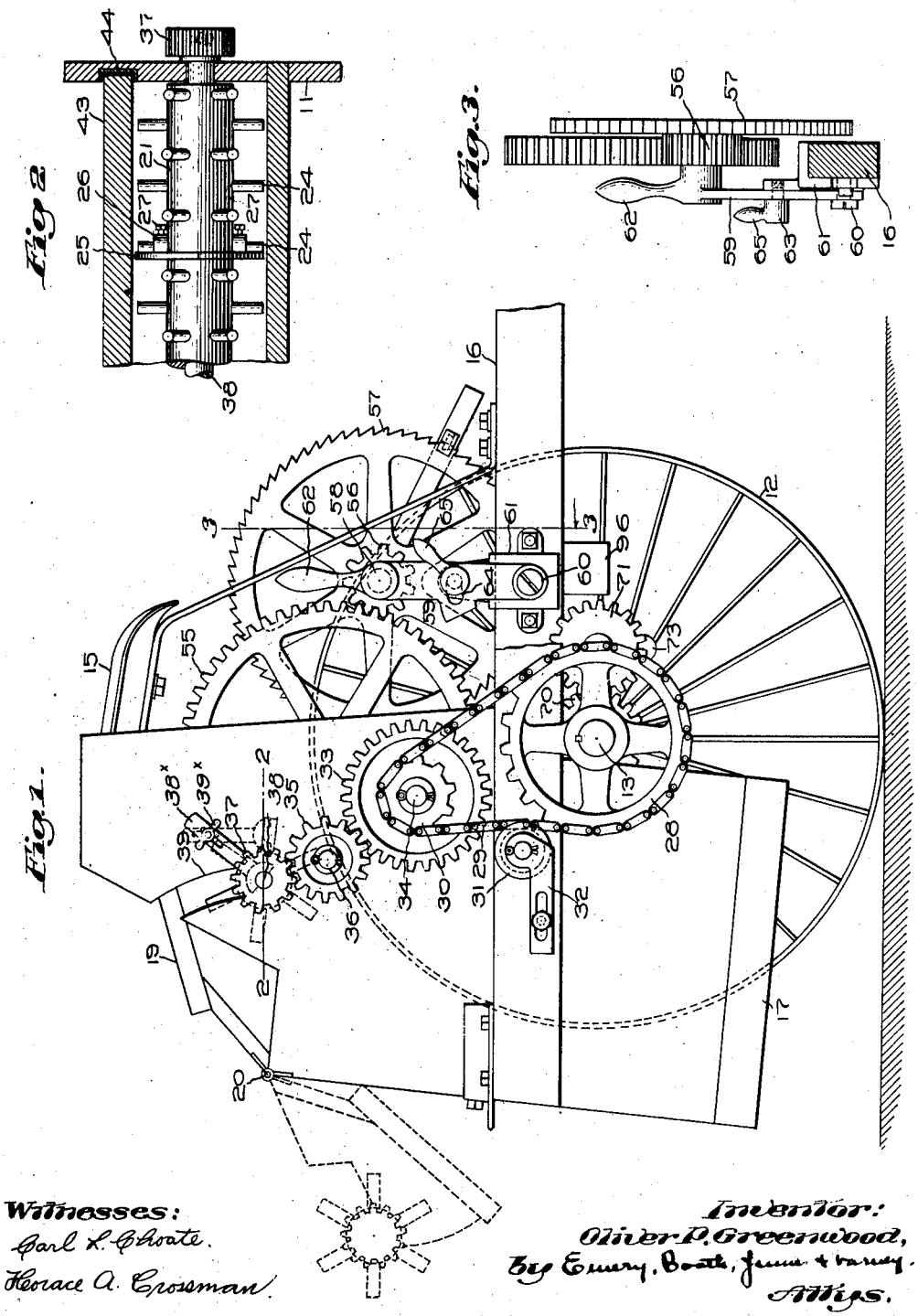

O. P. GREENWOOD.
DISTRIBUTING MACHINE.
APPLICATION FILED SEPT. 19, 1912. RENEWED SEPT. 30, 1919.
1,339,557. Patented May 11, 1920.
3 SHEETS—SHEET 2.
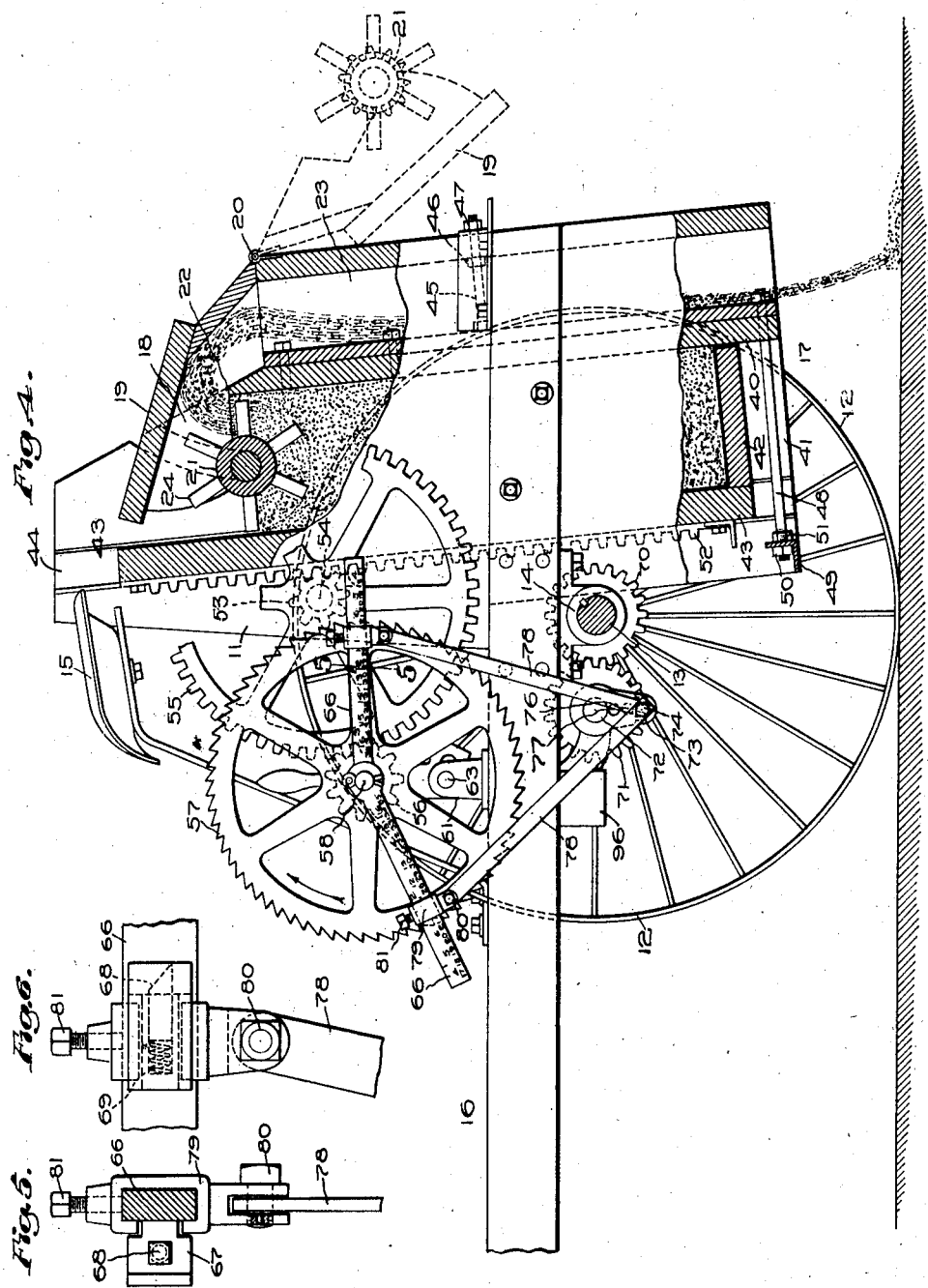

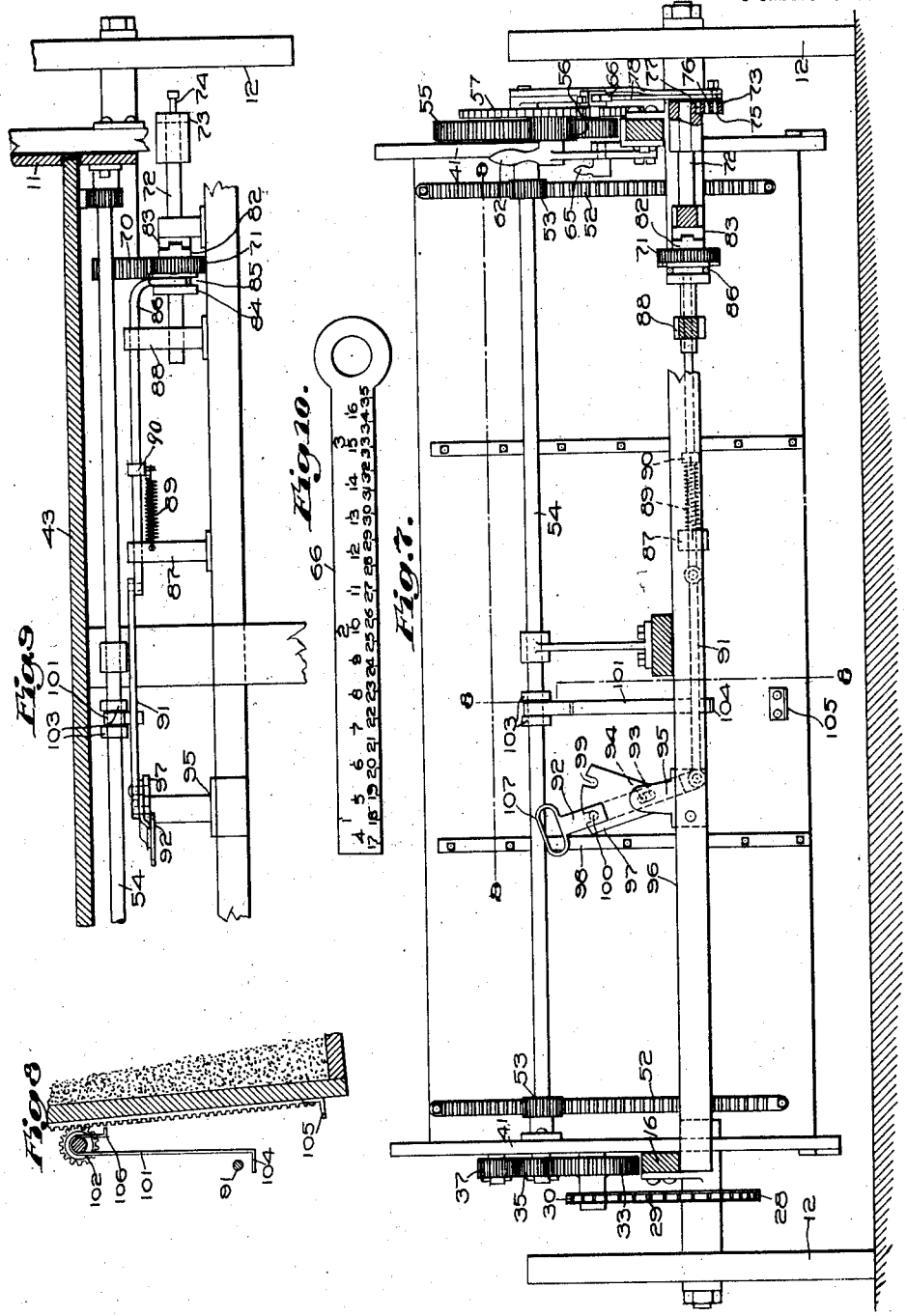

UNITED STATES PATENT OFFICE.

OLIVER P. GREENWOOD, OF BILLERICA, MASSACHUSETTS, ASSIGNOR, BY MESNE ASSIGNMENTS, TO ALICE B. DOVE, OF ANDOVER, MASSACHUSETTS.

DISTRIBUTING-MACHINE.

1,339,557.   Specification of Letters Patent.   Patented May 11, 1920.

Application filed September 19, 1912, Serial No. 721,331. Renewed September 30, 1919. Serial No. 327,474.

*To all whom it may concern:*

Be it known that I, OLIVER P. GREENWOOD, a citizen of the United States, and a resident of Billerica, in the county of Middlesex and State of Massachusetts, have invented an Improvement in Distributing-Machines, of which the following description, in connection with the accompanying drawings, is a specification, like characters on the drawings representing like parts.

This invention relates to distributing machines, and more especially, though not exclusively, to machines for distributing fertilizer, lime and the like, and will be best understood by reference to the following description, when taken in connection with the accompanying illustration of one specific embodiment thereof, while its scope will be more particularly pointed out in the appended claims.

In the drawings:—

Figure 1 is a side elevation of a fertilizer distributer embodying my invention;

Fig. 2 is a detail plan section, partly broken away on line 2—2 of Fig. 1;

Fig. 3 is a detail sectional view on line 3—3 of Fig. 1, looking toward the left;

Fig. 4 is an elevation partly in vertical section of the machine viewed from the side opposite to that shown in Fig. 1;

Fig. 5 is an enlarged detail section on line 5—5 of Fig. 4, looking toward the right;

Fig. 6 is a detail side elevation of the parts shown in Fig. 5;

Fig. 7 is a front elevation of the machine, some of the parts being partly broken away, and others shown in section to more clearly illustrate the features of the invention;

Fig. 8 is a detail sectional view on line 8—8 of Fig. 7 looking toward the left;

Fig. 9 is a detail plan section on line 9—9 of Fig. 7, some of the parts being broken away; and Fig. 10 is a detail elevation of one of the pawl carrying arms illustrating the graduations and numerals thereon.

Referring to the drawings, and to the embodiment of my invention which I have there shown for illustrative purposes, I have shown a cart which may be propelled in any desired manner, the one illustrated being of the horse-drawn type, having a frame 11 mounted on wheels 12—12, the latter secured to an axle 13 journaled in suitable bearings 14 on the frame of the machine.

The machine may be provided with a suitable seat 15 for the driver, and may be provided with a shaft or shafts 16 for the horse or horses.

Mounted on the frame 11 is a hopper 17 for the fertilizer or other material, which hopper may be of any suitable construction, but herein has an outlet 18 at its upper portion. This opening may be closed by suitable means, herein a cover 19 mounted upon a suitable hinge or hinges 20, so as to be capable of being swung from the position shown in full lines in Figs. 1 and 4 to the position shown in dotted lines therein, to facilitate the replenishing of the supply of fertilizer in the hopper.

Suitable means are provided for feeding the material from the upper portion of the hopper, and distributing the same upon the ground, and for this purpose, I preferably employ a feeding and distributing roller 21 located in the upper portion of the hopper, and suitably driven to throw the fertilizer upwardly and laterally through a lateral opening 22 leading from the rear side of the hopper into a conduit 23, which serves to guide the fertilizer toward the ground and prevent the same from being blown about by the wind and strewn unevenly.

The feeding and distributing roller may be of any suitable construction, but herein is provided with a large number of radial pins 24, which serve to stir up the fertilizer as well as to transfer the same at the proper rate of feed into the conduit 22, whence it falls by gravity and is distributed evenly upon the ground.

If desired, the feeding and distributing roller may be provided with one or more disks 25, for the purpose of preventing the fertilizer from shifting toward one end or the other of the row when the machine is on a hillside. These disks may be secured to the roller in any desired manner, as for example by being provided with ears 26 slipped down upon the pins 24 and secured to the latter by a set-screw 27.

The feeding and distributing roller may be driven by any suitable means, but I have herein provided for that purpose suitable gearing driven by the axle 13. Secured to the axle is a driving sprocket wheel 28, which acts through a chain 29 to drive a driven sprocket wheel 30, a proper tension of the chain being maintained by suitable means, herein a take-up roller 31 journaled on an adjustable bracket 32. The driven sprocket wheel 30 is secured to a gear 33, and both are journaled on a stud 34 on the side of the hopper. The gear 33 drives the feeding and distributing roller 21 through an idler gear 35, journaled on a stud 36, and a gear 37 secured to a shaft 38 of the roller.

Preferably the feeding and distributing roller is journaled and supported upon the hopper cover 19, so that when the latter is opened, the roller will be carried therewith and will thus leave the upper portion of the hopper unobstructed. The sides of the hopper are provided with suitable slots 39 to receive the shaft 38, and permit the latter to be swung from its normal position when the cover is opened. It will now be evident that the driving of the feeding and distributing roller must be such that when the cover is opened as described, the coöperating driving gears 35 and 37 may be readily unmeshed, and to that end, the gear 37 which is secured to the shaft 38, is preferably placed directly above the gear 35. When the cover is again closed, the gears 37 and 35 may be readily meshed in an obvious manner. As a means for holding the cover down and normally maintaining the gears 37 and 35 in mesh, I may provide any suitable devices, but herein I employ a locking device comprising an adjustable slotted bar 38× normally engaging the shaft 38 and secured by a clamp-screw 39×.

Since the fertilizer is to be fed from the upper portion of the hopper, it will be evident that there must be some means provided for feeding the body of fertilizer upwardly to a point where it can be acted upon by the feeding and distributing roller hereinbefore described. To this end, the hopper is provided with a stationary rear wall 40, stationary side walls 41, a vertically movable bottom 42, and a vertically movable front wall 43, the latter being secured to the bottom, and suitable means are provided for moving the bottom and front wall vertically to gradually raise the body of the fertilizer. The vertically movable front wall may be guided in any suitable manner, the side walls 4 for that purpose being herein provided with ways or grooves 44. In order to guard against possible sticking of the bottom 42 against the rear wall 40, due to swelling of the wood or for any other reason, I preferably provide the rear wall with suitable means of adjustment, herein an adjusting bolt 45 passing through the rear wall of the conduit 23 and provided with nuts 46 and 47 engaging the inner and outer faces of said wall, and I also provide a bolt 48 secured at one end to the wall 40 and having its other end adjustably secured to a cross member 49 of the frame by nuts 50 and 51. By the described means, the rear wall 40 may be adjusted transversely of the path of the movable bottom 42, and a proper clearance provided between these parts, as shown at the lower portion of Fig. 4, so that the bottom of the hopper may rise and fall freely.

To feed the bottom of the hopper upwardly, I may provide any suitable mechanism, but herein I employ for this purpose a pair of racks 52—52, meshing with pinions 53—53 secured to a shaft 54 journaled in suitable bearings in the side walls 41 of the hopper. Secured to one end of this shaft is a gear 55 meshing with a pinion 56 secured to a ratchet wheel 57. This pinion and ratchet wheel are journaled on a stud 58 secured to an adjustable support 59 pivoted at 60 upon a bracket 61 on the frame 11. The swinging support 59 may be provided with a handle 62 by means of which the same may be swung toward the right from the position shown in Fig. 1, to withdraw the pinion 56 out of mesh with the gear 55. The swinging support 59 may be secured in the desired position of adjustment by a clamping screw 63 passing through a segmental slot 64 in said support, and threaded into the bracket 61. For convenience of manipulation, this clamping screw may be provided with a suitable handle 65.

Pivoted on the stud 58 are two arms 66—66, constituting pawl carriers, each having a laterally projecting lug or box 67, in which is slidably mounted a pawl 68 held in engagement with the ratchet 57 by a spring 69. During the operation of the machine, these arms are advanced and retracted in alternation by suitable mechanism connected to the wheels 12. Herein there is secured to the axle 13 a driving gear 70 meshing with a driven gear 71 loosely mounted on a crank shaft 72 having a crank 73. This crank is provided with a crank pin 74, which is preferably radially adjustable, the crank 73 for that purpose being preferably provided with a plurality of threaded holes 75, 76 and 77, at varying distances from the center of the crank shaft to receive the crank pin. In this way, different throws of the crank may be obtained.

The crank pin 74 is connected by pitmen or links 78—78 to the arms 66—66 respectively, and preferably in such a manner as to be capable of adjustment longitudinally of the latter. To this end, the arms 66—66 are provided with sliding blocks 79, to which the links 78 are pivoted at 80, these blocks being adjustably secured to the arms in any suitable manner, as by means of set-screws 81. By this means, the effective lengths of the arms 66 may be varied at will, thus varying the strokes of the two pawls 68.

It will now be evident that when the crank 73 is rotated, the arms 66—66 will be advanced and retracted in alternation, and their oppositely facing pawls 68 operated in alternation will serve to impart to the ratchet 57 a continuous rotative movement in the direction of the arrow, Fig. 4. As a consequence, the mechanism just described will act through the pinion 56, gear 55, and pinions 53 and racks 52 to gradually raise the bottom of the hopper. The rate of movement of the bottom of the hopper, and the consequent rate of feed of the fertilizer may be varied by appropriately adjusting the crank pin 74 and the blocks 79, such adjustment of course causing a variation in the speed of rotation of the ratchet wheel 57, and a constant variation in the movement of the bottom of the hopper.

To facilitate the adjustment of the machine so that it will feed and distribute various predetermined amounts of fertilizer to the acre, the arms 66 may be suitably graduated, and provided with suitable numerals or other characters, indicating certain positions of adjustment of the adjustable blocks 79. Referring to Fig. 10, wherein I have shown the left-hand arm in detail, it will be observed that the arm is provided with three rows of graduations and numerals, the upper row having graduations numbered 1, 2 and 3, the second row having graduations numbered 4 to 16, inclusive, and the third row numbered 17 to 35, inclusive. Assuming that the distribution is in pounds of fertilizer to the acre, to set the machine for any amount from 400 to 1600, the sliding blocks 79 should be placed with their inner edges on the amount desired on their respective arms 66, and the crank-pin 74 should be placed in the hole 76. For example, if 1400 pounds to an acre, the sliding blocks should be placed with their inside edges on the figure 14. For distributing 100 to 200, or 300 pounds per acre, the crank pin 74 should be placed in the hole 77 in the crank 73, and then the sliding blocks should be adjusted to the desired point, as on the numerals 1, 2 and 3, according to whether 100, 200, or 300 pounds per acre are desired to be fed. For amounts exceeding 1600, the crank-pin 74 should be placed in the hole 75 and the sliding blocks should be placed on the figures 18 for 1800 pounds, 19 for 1900 pounds, and so on according to the amount desired. Since different materials have different weights per quart, and the machine distributes the materials by quart, it will of course be necessary in adjusting the machine to take into account such variations in weight, and this may be done by the use of a simple formula which will enable the operator very quickly and conveniently to determine the proper adjustment.

It will be evident that although the upward movement of the bottom of the hopper may be discontinued by the manual disconnection of the pinion 56 from the gear 55, as hereinbefore described, it will be desirable to provide some means for automatically interrupting the upward movement of the bottom of the hopper when it has reached a certain predetermined position. To this end, I may provide any suitable mechanism to effect a disconnection between the hopper bottom and the driving mechanism, but I prefer to employ for this purpose the mechanism which I will now describe.

Formed on, or secured to, the gear 71 is a clutch member 82, normally out of driving engagement with a clutch member 83, secured to the crank shaft 72. The gear 71 and clutch member 82 are loosely mounted on the shaft 72. Suitable means are provided for relatively actuating the clutch members, the gear 71 for this purpose being herein provided with a hub 84 having a circumferential groove 85, which receives a clutch shifting yoke 86 mounted to slide in suitable guides 87 and 88. Suitable means are provided constantly tending to throw the clutch members out of driving engagement, herein a spring 89 secured at one end to the guide 87, and at its other end to a collar 90 secured to the clutch shifting slide 86. The slide 86 is connected by a link 91 to the lower end of a clutch shifting lever 92, provided with a slot 93, which receives a pin 94 constituting a fulcrum for said lever. This pin is mounted in a bracket 95, secured to a cross member 96 of the frame. Now, it will be evident that, since the spring 89 is normally tending to urge the clutch member out of engagement with the clutch member 83, some means must be provided for opposing such a tendency and acting to hold the clutch members in driving engagement until the moment when it is desired to automatically disengage the clutch. To this end, the bracket 95 may be provided with a segment 97 having two notches 98 and 99, the former serving normally to receive and hold a pin 100 secured to the lever 92. In this way, the lever is locked, and consequently the clutch members are held in interengagement against the tension of the spring.

In order to provide for the automatic disengagement of the clutch when the hopper bottom has reached a certain predetermined point, suitable means may be provided for lifting the clutch shifting lever 92 until the pin 100 rises out of the notch 98, whereupon the spring 89 will start itself to shift the clutch member 82 out of engagement with the clutch member 83. To this end, I may provide a slide 101 having its upper end in the form of a hook 102 hooked over and resting upon the shaft 54 and interposed between a pair of collars 103, the latter serving to hold the slide against movement longitudinally of said shaft. The slide 101 may be provided with a laterally projecting lug 104 located beneath the link 91, in such a position that when said slide is lifted to the proper extent, it will act through said link to lift the clutch shifting lever 92 and allow the upper end of the latter to be drawn toward the right, thus causing the disengagement of the clutch. The slide 101 may be lifted at a predetermined point in the travel of the hopper bottom by any suitable means, but herein I employ for that purpose a laterally projecting lug or bracket 105, secured to the front face of the front wall 43, and adapted to engage an abutment 106 on the slide 101, thus lifting the latter and shifting the clutch as described. When the clutch has thus been shifted, the pin 100 will drop into the notch 99, and hold the clutch shifting lever against accidental movement. As a means for manually controlling the clutch, the clutch lever 92 may be provided with a grasping handle 107, which may be operated in an obvious manner to effect the engagement and disengagement of the clutch.

Having thus specifically described the machine, I will now describe its general operation. The hopper bottom 42 is first placed in its lowermost position, the hopper cover 19 and the distributing roller 21 are swung from the position shown in full lines in Figs. 1 and 4 to the position shown in dotted lines, and the hopper is then filled with the fertilizer or other material, which it is desired to distribute. The cover 19 is then closed and the gear 37 engaged to the gear 35. The sliding blocks 79 and the crank pin 74 are then placed in their proper positions of adjustment for the amount of fertilizer which it is desired to distribute to each acre of land. The clutch lever 92 is then moved to cause the engagement of the clutch members 82 and 83. The machine is then drawn forward, whereupon the distributing roller 21 will at once start to rotate, thus gradually feeding the fertilizer from the hopper into the conduit in the course indicated in a general way in Fig. 4, while the hopper bottom is gradually raised to continue to supply fertilizer to the distributing roller in accordance with the demands of the latter. The bottom of the hopper is prevented from striking the pins of the distributing roller by reason of the fact that the clutch is automatically disengaged just before the hopper bottom reaches the pins. The hopper bottom is then returned to its initial position and the hopper is then refilled.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts nor to the specific embodiment herein shown, but that extensive deviations from the illustrated form or embodiment of the invention may be made without departing from the principles thereof.

Having thus described my invention, what I claim and desire by Letters Patent to secure, is:—

1. An apparatus of the class described having, in combination, a hopper having a stationary wall and a relatively movable materials-feeding wall, means to move said movable wall along said stationary wall to feed the materials, and means for adjusting said stationary wall transversely of the path of said movable wall.

2. An apparatus of the class described having, in combination, a hopper having a stationary wall, a parallel movable wall and a movable material-moving wall, means to move said movable walls relatively to said stationary wall to feed the materials, and means permitting adjustment of said stationary wall transversely of the path of said movable walls.

In testimony whereof, I have signed my name to this specification, in the presence of two subscribing witnesses.

OLIVER P. GREENWOOD.

Witnesses:
LOUIS A. JONES,
CLARA L. STEWART.